July 8, 1969 T. B. O'CONNELL ET AL 3,454,389

GLASS SHEET TEMPERING APPARATUS

Filed Sept. 2, 1965

INVENTORS
Thomas B. O'Connell and
BY Richard A. Herrington

Nobbe & Swope
ATTORNEYS

United States Patent Office 3,454,389
Patented July 8, 1969

---

3,454,389
GLASS SHEET TEMPERING APPARATUS
Thomas B. O'Connell, Toledo, and Richard A. Herrington, Walbridge, Ohio, assignors to Libbey-Owens-Ford Glass Company, Toledo, Ohio, a corporation of Ohio
Filed Sept. 2, 1965, Ser. No. 484,602
Int. Cl. C03b 27/00
U.S. Cl. 65—351                4 Claims

ABSTRACT OF THE DISCLOSURE

Apparatus for tempering glass sheets by means of streams of air at high volume and low pressure. Air is supplied, by suitable plenum chambers and manifolds, at high pressure and relatively low volume to aspirating tubes which draw in atmospheric air and the resulting air mixture is directed against the sheet surfaces. The manifolds which carry the aspirating tubes are spaced apart to provide an exhaust path for the air after it strikes the sheet surfaces.

---

This invention relates broadly to the tempering of sheet material and more particularly to improved apparatus for tempering glass sheets or plates.

It is common practice in the tempering of glass sheets to first heat the sheet to substantially the point of softening of the glass and then suddenly chill the heated sheet to place the outer surface thereof under compression and the interior under tension. By following this procedure the mechanical properties of the glass may be improved to increase the physical strength thereof and modify its breaking characteristics so that when a tempered glass sheet is broken it will shatter or disintegrate into relatively small, harmless particles rather than large pieces having jagged edges.

The sudden chilling of the heated sheets to produce the desired stresses in the glass is effected by flushing the opposed surfaces of the glass sheet with a continuous supply of cooling medium or gases. For this purpose, it is desirable that a large supply of relatively low-pressure cooling gases be directed against the surfaces of the glass sheets. Furthermore, it is known that as the thickness of the glass sheet decreases, to provide the desired temper, the rate of cooling of the glass surfaces must be increased by increasing the volume of cooling medium being directed against the surfaces thereby accelerating the flushing action.

One method of increasing the volume of cooling gases against the surfaces is to increase the pressure of the gases which are utilized in the tempering operation. However, this procedure has presented problems in tempering thin sheets in that the higher pressures have adverse effects on the thin glass sheets which are in a heat-softened condition.

Another method of increasing the volume of cooling gases against the surfaces is to increase the size of the equipment supplying this air. However, the size of the equipment used to deliver the gases is limited by the space available adjacent the glass sheets.

The primary aim of this invention is to provide means for obtaining a large volume of low-pressure tempering cooling medium adjacent the surfaces of a glass sheet or plate to be tempered with equipment of limited size.

Another object is to provide apparatus for tempering glass sheets in which the flow characteristics can be readily modified to vary the pressure of the tempering medium at the glass surface.

A further object is to accomplish the foregoing by directing streams of cooling gases from a high-pressure supply towards the sheet through aspirating tubes which will increase the volume of cooling gases flowing against the surfaces of the sheets to be tempered while keeping the pressure of the gases at the surfaces relatively low.

Other objects and advantages of the invention will become more apparent during the course of the following description when read in connection with the accompanying drawings.

In the drawings, wherein like numerals are employed to designate like parts throughout the same:

Although the novel cooling means of this invention has a wide field of usefulness in connection with tempering of heated bodies, the application of the invention to the continuous bending and tempering of glass sheets has proven advantageous and as such will be specifically described herein in connection with apparatus of that type.

Figure 1:
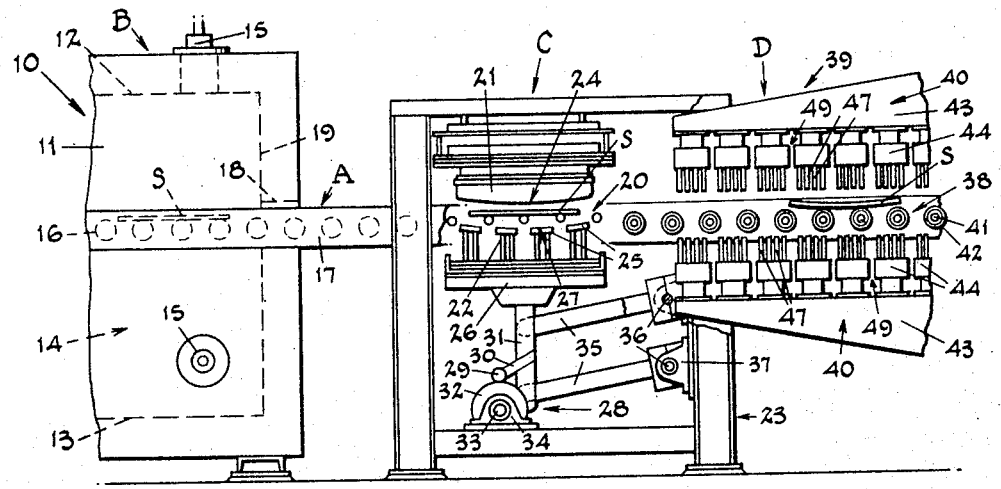
FIG. 1 is a side elevation view partially in section of a bending and tempering apparatus embodying the novel features of the present invention.

For the purpose of illustration, the novel features of the present invention are shown in FIG. 1 incorporated in a bending and tempering apparatus adapted for use in the continuous production of bent, tempered glass sheets. This apparatus includes a continuous conveyor system A adapted to support a plurality of sheets S in a horizontal plane for movement along a path through a heating section B, a bending section C and a tempering section D.

In the illustrated embodiment, the heating section B includes a tunnel type furnace 10 having side walls 11, a top wall 12 and a bottom wall 13 forming a heating chamber 14. The chamber 14 may be heated in any desired manner by suitable heating means, such as burners 15, located in the side walls and top wall of the furnace. The heating means are suitably controlled by apparatus (not shown) to obtain the desired temperature at various points in the heating chamber. The sheets S are carried through the heating chamber 14 of the furnace on a plurality of conveyor rolls 16, which form part of the conveying system A, that extend transversely across the chamber with their opposite ends journaled in rails 17 extending along the side walls of the furnace.

In operation, a plurality of sheets are loaded on the conveyor rolls 16 at the entrance end of the furnace (not shown) and heated to the desired temperature during their passage therethrough, after which the heated sheets then pass through an opening 18 located in the end wall 19 of the furnace and are received on a plurality of second conveyor rolls 20, also part of the conveying system A. The second conveyor rolls 20 are located in the bending section C and are also suitably journaled in the rails 17 extending longitudinally on opposite sides of the bending section.

In the illustrated embodiment, the bending section includes male and female mold parts 21 and 22 which have opposed complementary bending surfaces and are mounted for relative movement towards and away from each other on a framework 23. In the apparatus shown, the male mold part 21 has a generally convex shaping surface 24 and is fixedly mounted above the conveyor rolls 20 while the female mold part 22 is located below the conveyor rolls and is mounted for relative movement towards and away from the male mold part. For this purpose, the female mold part consists of a plurality of sections 25 mounted on a carriage 26 in a manner to form a ring-type structure having a generally concave shaping surface 27 with each of the sections capable of passing between spaced pairs of conveyor rolls 20.

The carriage and female mold part are mounted for vertical movement from a first or open position which is located below the conveyor rolls 20 to a second or closed position, where the female mold part is located above the conveyor rolls 20 or on the same side as the male mold part. This movement is adapted to raise a heated glass sheet S off of the conveyor rolls 20 and press the sheet between the complemental shaping surfaces of the two mold parts to form the sheet to the desired shape after which it is returned to the conveyor rolls 20 and moved into the cooling section D.

Raising and lowering of the carriage and female mold part may be effected by a suitable actuating mechanism 28. While many different actuating mechanisms could be employed to impart the desired reciprocal movement to the female mold part, in the illustrated embodiment a simple cam and follower mechanism is shown. Although only one such mechanism can be seen in FIG. 1, two are utilized with one being disposed on each side of the path of movement of the glass sheets. Since the mechanisms are identical in construction, a detailed description of one will suffice for the present purposes.

The actuating mechanism 28 includes a cam follower 29 coupled to an arm 30 secured to a bar 31 depending from the lower surface of the carriage. The cam follower rides on a disc cam 32 shaped in a conventional manner to impart the desired vertical motion to the cam follower and thus the carriage. The disc cam is fixedly secured on a shaft 33 which has opposite ends journaled in bearing blocks 34 mounted on the framework 23 and driven by a suitable power source (not shown).

The carriage and female mold part are guided for movement between the raised and lowered positions by cross members 35 having one end fixed to shafts 36 which are journaled in bearing blocks 37 mounted on the framework 23. The opposite ends of the cross members are pivotally secured to the bar 31 depending from the carriage. In this manner, the members 35, bar 31 and vertically extending posts of the framework 23 form a four-bar linkage system for guiding the carriage and the female mold part during vertical movement.

The bending operation may be automatically controlled by any suitable device. For example, a beam may be projected across the path of the moving sheet at the entrance end of the bending section towards a photocell operatively connected to a timing mechanism controlling the operation of the power source driving the shaft 33. Then as the heated sheet moves into the bending section and passes between the male and female mold parts, thereby interrupting the beam, the cam and follower mechanism is activated rotating the disc cam 32 one turn which raises the female mold part above the conveyor rolls 20 to pick the moving sheet off the conveyor rolls 20, press it between the complemental shaping surfaces and thereafter return the bent sheet to the conveyor rolls.

After the sheets have been bent to the desired curvature in the bending section C, they are moved out of the heating section and are received on a plurality of third conveyor rollers 38, also part of the conveyor system A, which includes means 39 located in the tempering section D for cooling the sheets. In the illustrated embodiment the means 39 include cooling means 40 located above and below the conveyor rollers 38 to direct cooling gases against opposed surfaces of the sheets.

In order to have a major portion of the lower surface of the sheet in direct communication with the cooling gases, the conveyor rollers each include a shaft 41 rotatable about a parallel axis extending transversely of the path of the moving sheet and each shaft has rolls 42, axially spaced apart along the shaft and fixedly secured thereto, with the rolls being covered by a suitable heat-resistant refractory material. The spaced rolls on each shaft therefore allow the major area of the lower surface of the sheet to be in direct communication with the cooling medium directed thereagainst and also reduce the area of contact of the rollers with the sheet surface thereby minimizing scratching and marring of the sheet surface. The opposite ends of the shafts 41 are journaled in the rails 17 extending on opposite sides of the cooling section and are rotatably driven in common by a conventional power drive means (not shown) to move the sheets through the tempering section D.

As noted above, the magnitude of the stresses or degree of temper imparted to the glass is dependent upon the rate at which the sheet is cooled from the elevated bending temperatures. This rate of cooling depends to a large extent upon the volume of cooling gases flowing across the surfaces of the sheet thereby absorbing heat from the glass and carrying this heat away from the sheet. However, to impart the desired temper in a thin glass sheet the volume of cooling gases must be increased without increasing the pressure of the cooling gases at the glass surface.

To facilitate rapid cooling of thin glass sheets, the present invention contemplates novel cooling means which increases the volume of cooling gases flowing across the sheel surfaces while retaining the pressure at the surface thereof relatively low, by directing streams of these gases from a high-pressure supply source toward the surfaces to be cooled through an aspirating means which will increase the volume of original gases by drawing gases from the surrounding atmosphere. In this way, the equipment needed for delivering the cooling gases to the sheets need only be of sufficient size to carry the gases emanating from the high-pressure supply source toward the surfaces to be cooled through an aspirating means which will increase the volume of original gases by drawing gases from the surrounding atmosphere. At the same time, however, a large volume of gases at low pressures is made available at the sheet surfaces to rapidly reduce the temperatures thereof.

In the illustrated embodiment of the invention, the novel cooling means comprises a plurality of manifolds disposed adjacent the surfaces of the sheets to be tempered and having openings therein facing the surfaces of the sheet to produce a plurality of streams of cooling gases directed toward the surfaces of the sheets. Aspirating means are located in surrounding relation with each of the openings so that the streams of cooling gases flowing therethrough creating areas of negative pressure surrounding the streams resulting in additional gases in the atmosphere being drawn into the streams and delivered to the surfaces of the sheets to be cooled.

Figure 2:
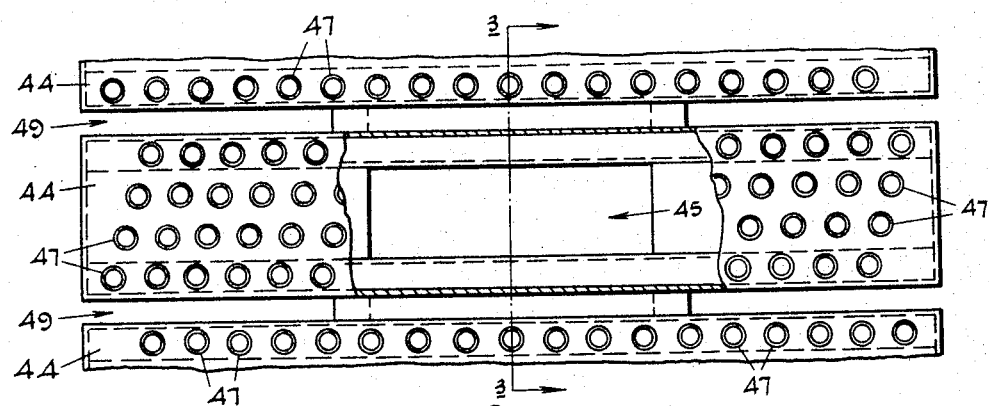
FIG. 2 is an enlarged fragmentary plan view of the cooling means constructed in accordance with the present invention.

As best shown in FIGS. 1 and 2, the cooling means 40 each include a plenum chamber 43 extending along the path of the moving sheet in the cooling section D which is connected to a source (not shown) of a cooling medium maintained under high pressures; the cooling medium in the illustrative embodiment being air. A plurality of manifolds 44 communicate with the plenum chamber through openings 45 and extend transversely of the path of the moving sheets. Each manifold is provided with a plurality of openings 46 for producing streams of cooling air flowing outwardly of the manifold toward the sheets moving along the path.

The openings 46 in each of the manifolds are arranged in spaced parallel rows with adjacent rows of openings in staggered relation providing an overlapping pattern to more evenly distribute the air across the surface of the glass sheet.

Figure 3:
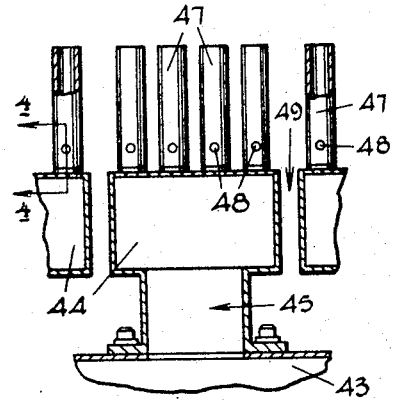
FIG. 3 is a transverse sectional view taken along line 3—3 of FIG. 2.

Each of the openings 46 in the top surface of the manifolds 44 is surrounded by a tube or pipe 47 coupled to and extending from the top surface of the manifolds. The tubes 47 extend inwardly toward the path of the moving sheets with the innermost ends being located in a common plane as is best shown in FIG. 3. Each tube 47 is provided with one or more apertures 48 through the wall thereof adjacent the manifold which constitute aspirating orifices through which surrounding atmospheric air may be drawn into the stream of air flowing through the opening 46.

As can be readily appreciated, the effective rate of cooling of the glass sheets depends not only upon the amount of cooling gases delivered to the sheet surfaces but also upon providing a sufficient opportunity for allowing the heated air to escape away from the heated sheets.

To this end, in accordance with another aspect of the invention, the plenum chambers 43 extend along the center of the path and each manifold 44 communicating therewith consists of a relatively long, narrow, tubular member extending transversely across the path and laterally outwardly on each side of the plenum. The manifolds are spaced apart along the path thereby providing escape areas 49 between adjacent manifolds.

As can readily be appreciated, by utilizing primary air at comparatively high pressures, the size of the plenum and manifolds required to deliver this high-pressure air may be restricted sufficiently to provide relatively large escape areas adjacent the path of the moving sheet for the heated air to escape from the surfaces of the sheets.

It should be noted that the thickness of the sheet to be tempered determines the maximum amount of pressures which may be produced at the surfaces of the sheet without producing adverse effects on the finished product. For this purpose, in accordance with another aspect of the invention the openings are provided with removable plugs having restricted orifices therein through which the streams of gases are directed from the manifolds to the sheets.

Figure 4:
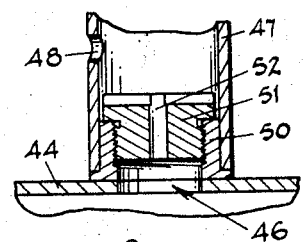
FIG. 4 is an enlarged fragmentary sectional view taken along line 4—4 of FIG. 3.

To this end, as is best shown in FIG. 4, an internally threaded coupling 50 is fixed to the wall of the manifold in surrounding relation with each opening 46 and projects inwardly toward the path of movement of the sheets. An orifice plug 51 having a restricted orifice 52 extending axially therethrough is threaded into the coupling 50. This novel arrangement provides a ready means for varying the pressure and amount of cooling air adjacent the sheet surface by merely removing the plugs 51 and replacing them with plugs having different sized orifices.

As can be readily appreciated with reference to FIGS. 3 and 4, the air flowing through the restricted orifices 52 draws air from the surrounding atmosphere through the aspirating orifices 48, strikes the glass in a number of comparable small streams and thereafter readily escapes between the tubes and the open areas 49 to permit a continuous flow of cool, fresh air at the surface of the glass.

Also, the flow characteristics of the streams may be readily varied by changing the size of the orifice 52 through which the high-pressure air flows. With the illustrated arrangement, changing the size of the orifice is easily accomplished by merely threading the orifice plug 51 out of the coupling and replacing it with another plug having a different diameter orifice.

It is to be understood that the size, arrangement and location of the various openings and tubes may be varied dependent upon the amount of air desired at the glass surface.

An experimental injector tube-type blasthead was constructed from a 18" x 4" x 2" high-pressure manifold having the openings 46 on 1" centers with adjacent rows of openings in staggered relation to provide an overlapping pattern. The plugs 51 were provided with 3/32" orifices with the tubes or pipes 47 being 3" long and each having two 1/4" diameter apertures or aspirating orifices 48 located adjacent the couplings.

Velocity measurements on the blastheads revealed that each tube was delivering air at the following volume and pressure:

| | Aspirating orifices closed | | |
|---|---|---|---|
| Manifold pressure (p.s.i.) | Total pressure, inches of $H_2O$ | Velocity, ft./min. | Volume, cu. ft./min. |
| 90 | 31 | 22,230 | 7.8 |
| 40 | 10 | 12,882 | 4.5 |

| | Aspirating orifices open | | |
|---|---|---|---|
| Manifold pressure (p.s.i.) | Total pressure, inches of $H_2O$ | Velocity, ft./min. | Volume, cu. ft./min. |
| 90 | 126 | 40,452 | 14.2 |
| 40 | 56 | 28,812 | 10.1 |

Using these injector-type blastheads, 4" x 14" samples the following glass thickness were tempered:

| Nominal size | Actual Thickness (in.) | Total pressure at glass |
|---|---|---|
| .090" plate | .095 | 60" water column. |
| SS sheet | .085 | 130" water column. |
| 15–17 oz. sheet | .078 | 150" water column. |

It will be appreciated that cooling means constructed in accordance with the present invention provides an efficient means for producing sufficient quantities of cooling gases adjacent the surfaces of thin glass sheets at pressures which will not have adverse effects on the finished product.

It is to be understood that the form of the invention herewith shown and described is to be taken as a preferred embodiment of the same, and that various changes in the shape, size and arrangement of parts may be resorted to without departing from the spirit of the invention.

We claim:
1. Apparatus for tempering glass sheets having in combination a conveyor for moving the sheets along a predetermined path through contiguous heating and cooling areas, heating means located in said heating area for heating the sheets to substantially the softening point of the glass, cooling means located adjacent said path in said cooling area to rapidly cool the sheets and temper the glass as the sheets move therethrough, said cooling means comprising a plenum chamber extending longitudinally along said path, a plurality of manifolds carried by and communicating with said chamber and having restricted orifices therein opening outward toward said path, each of said manifolds being spaced apart along said path to provide open spaces therebetween and being disposed transversely of said path with their opposite ends extending laterally outwardly beyond said chamber, a tube surrounding each of said orifices having one end fixed to said manifolds and extending outwardly therefrom towards said path, an opening formed in a wall of each said tubes adjacent said one end, and means for supplying cooling air under pressure to said chamber to flow into said manifold and outwardly through said orifices and through said tubes past said openings whereby ambient air is drawn through the openings to supplement the volume of air flowing through said tubes against the glass and escaping away from said sheets through said spaces between the manifolds, said spaces being of sufficient width to permit substantially free exhaust of the supplemented air flow.

2. Apparatus for tempering glass sheets as defined in claim 1, including a plug, through which said orifice is formed, received in said tube and covering an aperture in said manifold, said plug being removably secured in said tube to permit selective replacement thereof.

3. Apparatus for tempering glass sheets as defined in claim 2, in which said plugs are cylindrical and threadedly received in said tubes and said restricted orifice is defined by an axial hole of preselected diameter through said plug, one end of said plug having means formed therein adapted for engagement with a rotary tool for removal and replacement.

4. Apparatus for tempering glass sheets as defined in claim 1, in which said tubes are arranged in a plurality of rows aligned in a direction transverse to said path, each of said transverse rows being staggered in relation to adjacent rows to form a plurality of rows aligned obliquely to said path.

References Cited
UNITED STATES PATENTS 3,231,353  1/1966  Julio _____ 65—348

FOREIGN PATENTS 441,017  1/1936  Great Britain.

DONALL H. SYLVESTER, *Primary Examiner.*

A. D. KELLOG, *Assistant Examiner.*

U.S Cl. X.R.

65—104, 114, 273, 350